July 16, 1929.  M. P. McLAUGHLIN  1,720,799
METHOD OF AND MEANS FOR LOCKING NUTS
Filed Nov. 23, 1927
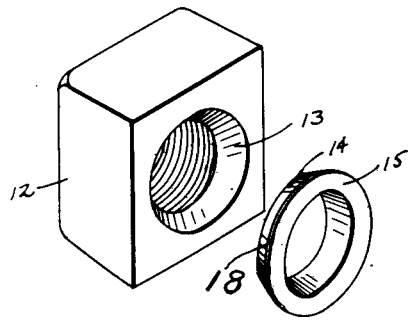
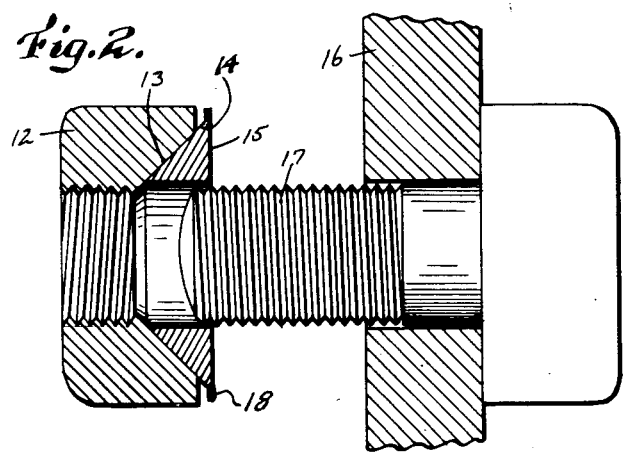
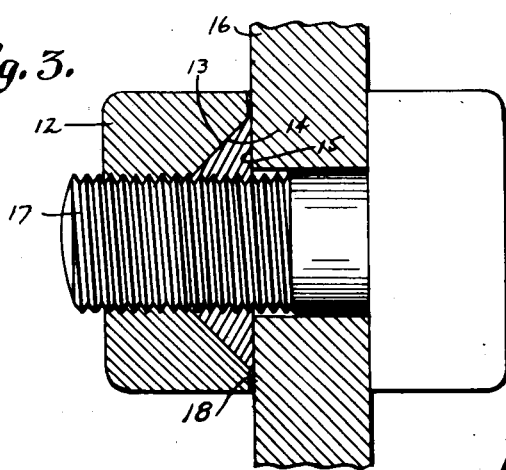
Inventor
M. P. McLaughlin
by Knight Brown Quinby May
Attys.

Patented July 16, 1929.

1,720,799

UNITED STATES PATENT OFFICE.

MILTON P. McLAUGHLIN, OF WAKEFIELD, MASSACHUSETTS, ASSIGNOR OF ONE-FOURTH TO WILLIAM S. LAKE, OF MELROSE, MASSACHUSETTS.

METHOD OF AND MEANS FOR LOCKING NUTS.

Application filed November 23, 1927. Serial No. 235,370.

The object of this invention is to enable a nut to be locked on a threaded bolt projecting from a nut abutment, by the compression, between the nut and the abutment, of a locking ring of compressible material, in such manner that the ring is closed upon convolutions of the bolt thread, and its inner margin is indented thereby, to prevent accidental rotation of the ring on the bolt, and the ring has a strong frictional engagement with the nut and the abutment, preventing accidental unscrewing rotation of the nut.

Of the accompanying drawings forming a part of this specification,—

Figure 1 shows in perspective, and separated from each other, a nut and a locking ring formed in accordance with my invention.

Figure 2 shows in section the nut and ring as first assembled, and a bolt abutment, the bolt being shown in elevation.

Figure 3 shows in section the nut, the ring, and the abutment, the bolt being shown in elevation, and the nut being set up against the abutment.

Figure 4 is a sectional view of the locking ring, showing the flange formed thereon.

The same reference characters indicate the same parts in all of the figures.

In carrying out my invention, I form in the inner side of a nut 12 of any suitable shape, an annular tapered seat 13, surrounding the threaded bore of the nut. I also form, independently of the nut, a locking ring of compressible material, preferably lead, although any other suitable material may be employed, having a tapered inner side face 14, conforming to the taper of the seat 13, and an outer side face 15, conforming to an abutment 16 from which a threaded bolt 17 projects. The abutment, which is shown conventionally, may be any member adapted to be clamped between the nut and the head of the bolt.

The locking ring is originally of greater external diameter than the seat 13, and of greater internal diameter than the diameter of the bolt, so that when the nut and ring are first assembled, the ring projects from the nut and does not completely fill or cover the seat 13, and the inner margin of the ring is spaced from the bolt, as shown by Figure 2. The form and relative arrangement of the seat and ring are such that when the nut is set up against the abutment, the ring fully enters the seat and is contracted and compressed thereby, until its inner margin is closed upon and indented by convolutions of the bolt threads, as shown by Figure 3. This engagement of the ring with the bolt prevents accidental rotation of the ring on the bolt, the compressed inner margin of the ring being firmly pressed against the thread convolutions of the bolt.

The compressed tapered face 14, and the face 15 of the ring are at the same time firmly pressed against the seat 13 and the abutment 16, so that accidental rotation of the nut is prevented.

I have found by practical experience, that when the nut is set up, as shown by Figure 3, it can be unscrewed only by force, such as that exerted by a wrench.

The compressed ring acts as a vibration-absorbing packing or sound deadener, to reduce noise caused by vibration of a structure in which the bolt, abutment and nut, are included. For example, when said structure is a rail joint, which includes a plurality of bolts and nuts, the compressed locking rings act to reduce the noise caused by the passage of car wheels over the joint.

The locking ring may have an outwardly projecting flange or fin 18, flush with the face 15, to increase the area of the surfaces of the ring which contact respectively with the nut and the abutment. The flange is reduced in thickness and increased in width by the pressure exerted on the ring when the nut is set up against the abutment.

I claim:

The combination with a nut having a bore expanded at one end to provide an annular tapered seat extending inward from one face of the nut, said bore being threaded from the inner end of said seat to the other face of the nut, of a closed ring of soft metal, the outer annular face of which is initially of greater diameter than the seat in the nut and tapered to conform to said seat and the interior diameter of which is initially greater than the diameter of the threaded bore of the nut, whereby when the ring is initially positioned in a nut it will closely contact with the annular tapered wall of said seat with its inner end spaced from the inner end of the seat and its outer end projecting from the outer end thereof, so that the ring will not contact with the body of a bolt engaged by the nut, said ring having about the periphery of its larger end an annular fin projecting radially from the ring and the body of the ring being forced into the nut longitudinally of said seat and into engagement with the thread of a bolt, and the said fin reduced in thickness and expanded radially, as the nut is screwed on the bolt, by an abutment surrounding the bolt, so that the body of the ring will be compressed radially into the thread of the bolt throughout the depth of the seat in the nut and the said annular fin will be clamped between the face of the nut and said abutment, for the purpose described.

In testimony whereof I have affixed by signature.

MILTON P. McLAUGHLIN.